May 2, 1950 A. S. PAGE 2,506,034
FOLDABLE TRAILER LOADING BEAM FOR TRUCKS
Filed Aug. 31, 1948 3 Sheets-Sheet 1

INVENTOR.
ANCEL S. PAGE
BY
ATTORNEY

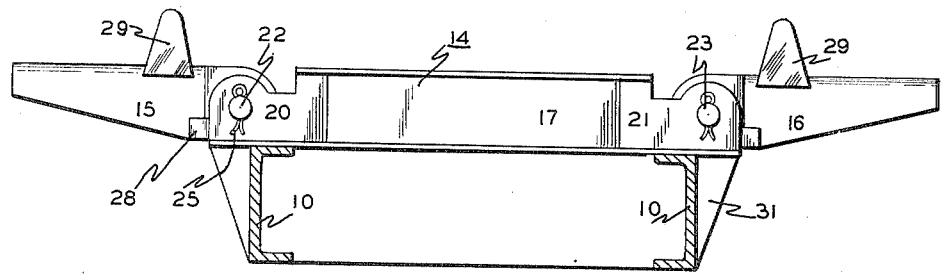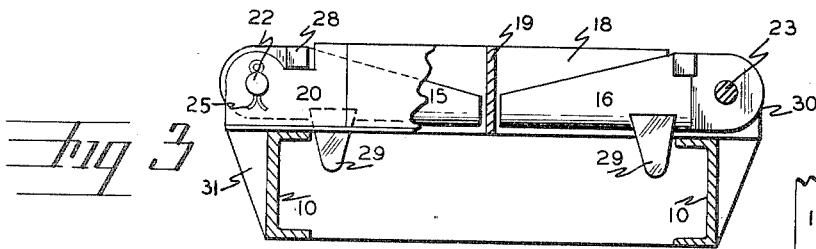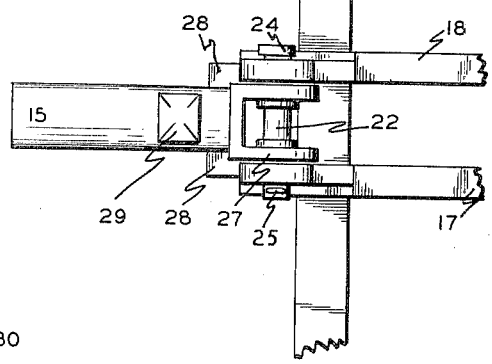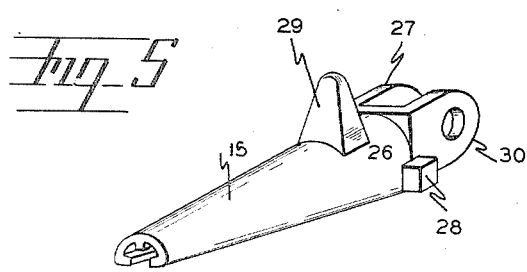

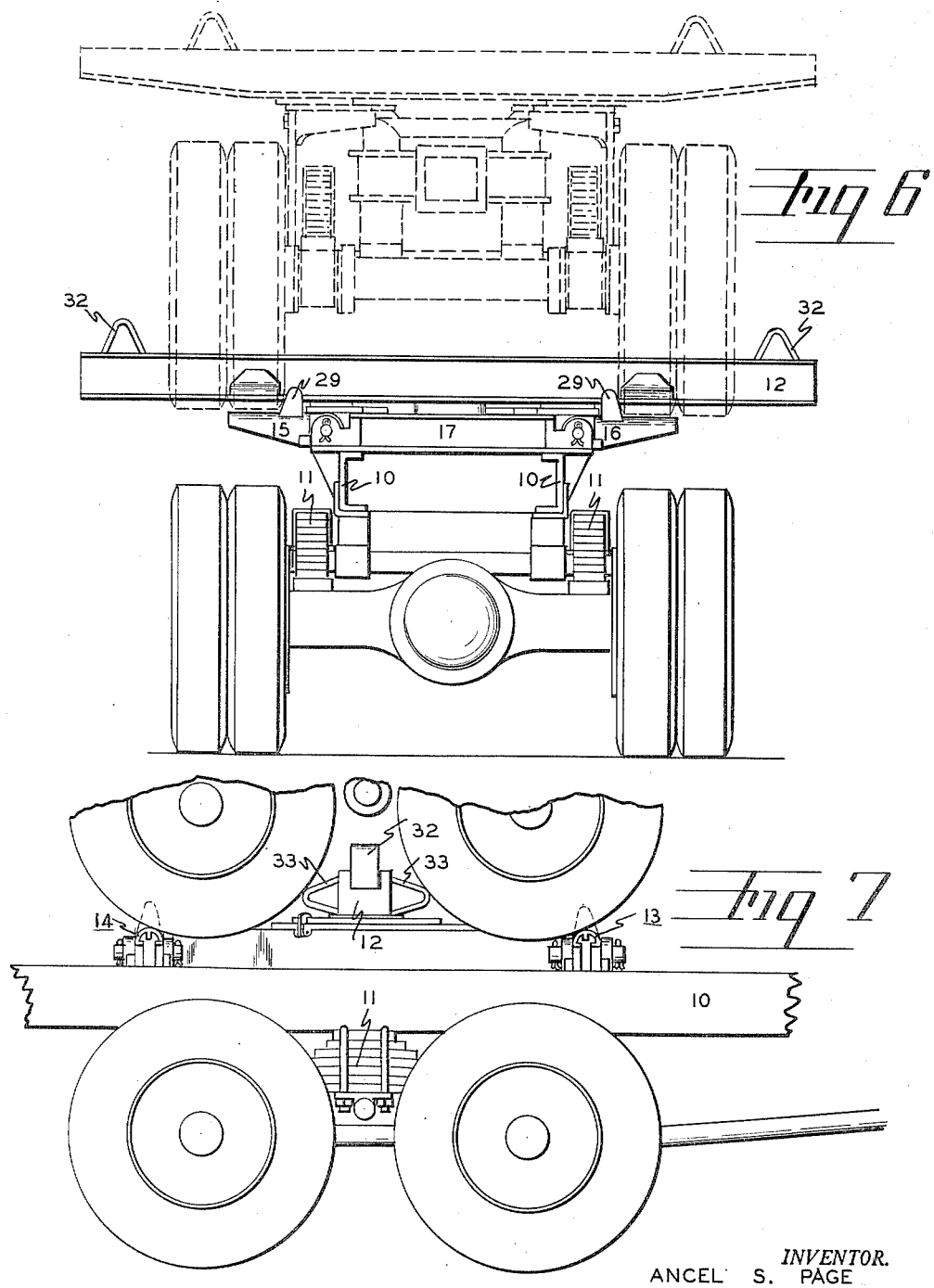

Patented May 2, 1950

2,506,034

UNITED STATES PATENT OFFICE 2,506,034

FOLDABLE TRAILER LOADING BEAM FOR TRUCKS

Ancel S. Page, Portland, Oreg.

Application August 31, 1948, Serial No. 47,082

5 Claims. (Cl. 280—145)

This invention relates to a truck and trailer combination of the general type used for hauling logs, timbers, pipes, and the like in which the rear end of the load is carried by the trailer and the front end of the load is carried by the truck, and in which, when no load is being carried, the trailer itself is customarily carried by the truck.

More particularly, this invention relates to trucks and trailers employed in the logging industry and especially to dual axle trucks and trailers used for such purpose.

To facilitate the driving of unloaded logging trucks and trailers on the highways and over logging roads, it is customary to mount the trailer on the truck. For this purpose various means are provided on the frame of the truck for supporting the trailer thereon. This supporting means most generally consists of transversely-extending bars or "loading beams" on the truck frame which act as mounting supports on which the trailer wheels rest when the trailer is placed on the truck. For dual axle trailers it is customary to provide a pair of such loading beams on the truck, one in front of, and the other behind the swivel mounting for the truck bunk or bolster, so that the front wheels of the trailer can rest on the front loading beam and on the truck bunk while the rear wheels of the trailer will rest on the rear loading beam and the truck bunk. Accordingly it has become customary in the logging industry to equip logging trucks with such transversely-extending bars or loading beams formed integral with, or welded or otherwise secured to, the bunk supporting frame.

Since such loading beams extend out over the wheels of the truck, one of the chief sources of difficulty with such means for mounting the trailer on the truck is that the ends of these loading beams frequently become bent down so that eventually they come into contact with the tires of the truck wheels. When this occurs the piercing of a tire or other damage to the tires sufficient to cause tire failure not infrequently results. Such bending down of a loading beam is most often due to inadvertent dropping of a heavy log or other object on the end of a loading beam, and since this particularly occurs in the woods usually distant from any repair shop, considerable loss of time results, or, in the event the deformation of the loading beam is not immediately discovered and an attempt is made to drive the truck with the loading beam engaging one of the tires, serious tire damage also occurs.

Although the dropping of a log on an end of a loading beam at the start of the log loading operation may not appear to cause the end of the loading beam to be bent down sufficiently to engage a truck tire, nevertheless, when the loading has been completed the flexing of the truck's springs under the load, or later when the truck encounters irregularities in the roadbed during the driving of the loaded truck, causing additional flexing of the springs, the bent loading beam end may then come into engagement with one of the tires and this condition may not be discovered until damage to the tire has already taken place.

An object of this invention is to avoid such difficulty by providing an improved loading beam for supporting a trailer on a truck which will be entirely out of the way except when it is being used as a rest support for trailer wheels or for a similar purpose.

Another object of this invention is to provide a loading beam having ends projecting the usual distance out beyond the sides of the truck frame but with these ends so arranged that they can quickly and easily be folded over the truck frame when not in use and thus prevent any inadvertent damage to such ends from dropped logs or encounters with other objects.

A further object of this invention is to provide an improved loading beam construction which will be simple and practical, which will enable replacements to be made quickly and easily, if required, and which will be inexpensive to manufacture.

The manner in which these objects are attained, the way in which my improved loading beam is constructed, and the manner in which the same is employed, will be briefly explained with reference to the accompanying drawings.

In the drawings:

Fig. 2 is an elevation of one of the loading beams of Fig. 1 taken on line 2—2 of Fig. 1 but drawn to a larger scale and with both ends of the loading beams shown in extended or outward position;

Fig. 3 is a similar elevation but showing both ends of the loading beam in folded or inward position and with a wall of the inner portion of the loading beam partly broken away for the sake of clarity;

Fig. 4 is a plan view of one of the folding ends of the loading beam, drawn to a still larger scale, showing the same in extended or outward position;

Fig. 5 is a view in perspective of an end of my improved loading beam showing this end portion entirely removed from the rest of the loading beam;

Fig. 6 is a rear elevation of the logging truck of Fig. 1 with a mounted logging trailer thereon indicated in broken lines and illustrating the employment of my improved loading beam; and Fig. 7 is a fragmentary side elevation of such a dual axle logging truck with a dual axle logging trailer mounted thereon, the trailer being supported on a pair of my improved loading beams.

Figure 1:
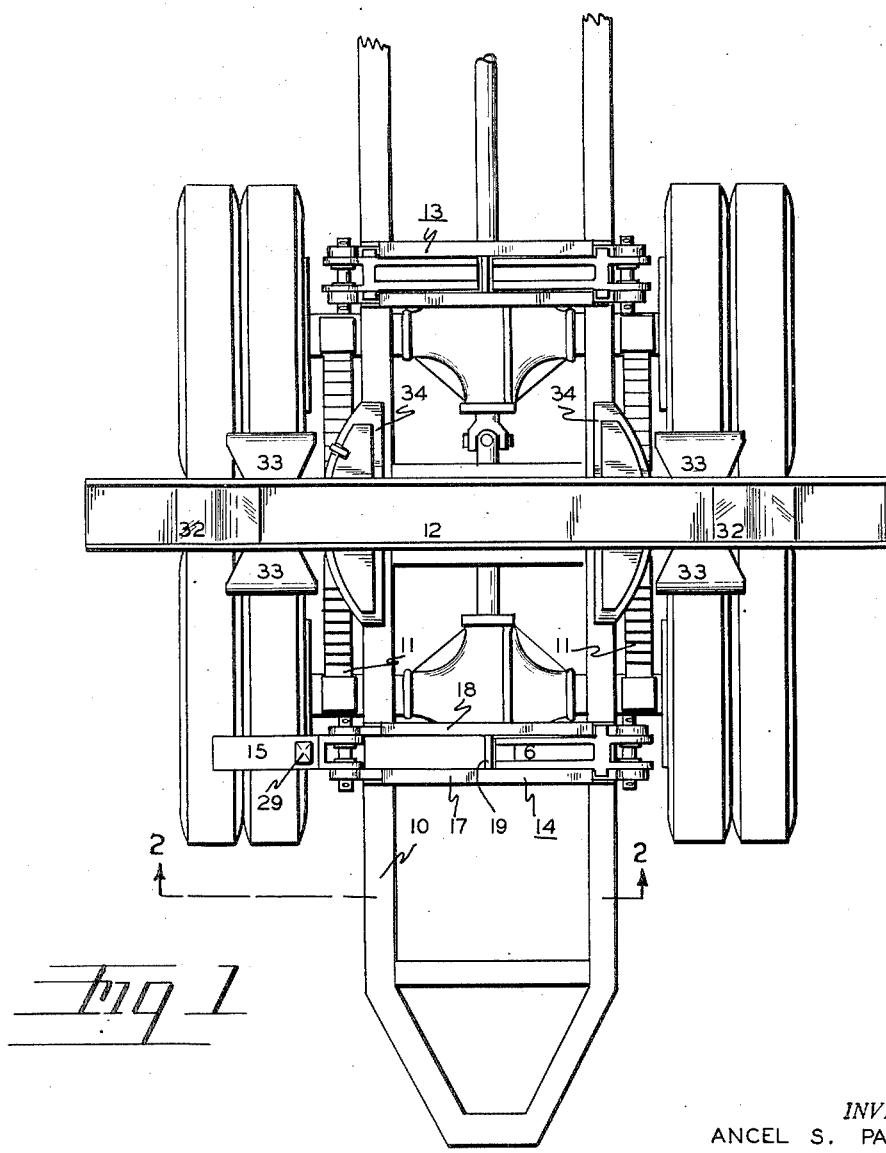
Fig. 1 is a plan view of the rear end of a dual axle logging truck with a pair of my foldable loading beams installed thereon, one of the ends of one of the loading beams being shown in extended position and the other three ends of the loading beams being shown in the folded or inward position.

Referring first to Fig. 1, the portion of the truck illustrated in this figure is typical of the dual axle trucks employed in the logging industry of the Northwest. The truck chassis has the bunk-supporting frame, indicated in general by the reference character 10. The chassis is supported on a pair of spring assemblies 11 or walking beams, located at each side and mounted on a central trunnion shaft (not shown), and the two axles for the two pairs of dual wheels are mounted on the respective ends of the spring assemblies. A bunk or bolster 12, on which the forward ends of the logs rest when the truck and its trailer are hauling a log load, is pivotally supported at its center on a swivel mounting (not shown), secured on suitable transverse frame structural members, so as to permit the truck to turn with respect to the log load. Rub plates 34 at each side prevent excessive tipping or swaying of the bunk and distribute part of the bunk load to the vehicle on one side or the other. The bunk 12 is provided with the usual adjustable chocks 32 to hold the logs from rolling off the ends of the bunk.

The logging trailer, on which the rear ends of the logs are carried, has a similar pivotally-mounted bunk, and the dual axle wheel suspension is in general similar to that indicated for the truck and need not be further described. When no load is being carried by the truck and its trailer, thus when the truck and trailer are returning to the woods for a fresh load of logs, it is customary, as previously mentioned, to have the trailer carried on the truck. In place of the customary bars or loading beams for supporting the trailer on the truck I provide foldable loading beams 13 and 14 spaced at equal distances ahead of and behind the bunk, respectively, as shown in Fig. 1. Both of these foldable loadable beams are identical and consequently a description of one of them will suffice.

Referring now to Figs. 2, 3 and 4, the loading beam 14 comprises a central portion to which are hinged two end portions 15 and 16. The central portion is preferably formed from a pair of angle iron members 17 and 18 (Fig. 4) extending in spaced parallel position transversely across the top of the frame 10 and welded or bolted thereto and connected by a central web 19 (Fig. 3). Reinforcing hinge blocks 20 and 21 are welded to the respective ends of each of the angle iron members 17 and 18 and carry the hinge shafts or pins 22 and 23, respectively, which extend through the holes in the hinge blocks. The entire central portion, however, can also be formed from a casting with the corresponding parts 17, 18 etc., all integral. Each hinge shaft or pin 22 or 23 is formed with an enlarged head 24 (Fig. 4) at one end and has a hole extending diametrically through the other end in which a suitable cotter pin 25 is placed so as to hold the hinge shaft or pin in position.

At the ends of the central portion of the loading beam the two end portions 15 and 16 are hinged as illustrated in Figs. 2, 3 and 4. These two end portions 15 and 16 are identical and preferably each is made from a single casting, the form of which is shown most clearly in Figs. 4 and 5. An elongated body 26 (Fig. 5) in the shape of an inverted U, the side walls of which gradually decrease in depth from the inner to the outer end in order to avoid unnecessary weight while furnishing necessary supporting strength, and also to provide maximum clearance between the outer end and the wheel tires, terminates on its inner end in a pair of parallel vertical ears 27 each provided with a central hole for the hinge pin 22 or 23. A pair of integral side lugs 28 at the lower inner end of the U-shaped body 26 are provided for the purpose of limiting the outward swinging movement of the entire hinged end portion. An integral top lug 29 is also provided near the inner end of the U-shaped body 26 to prevent side slippage of the wheel tire of the trailer on the loading beam when the trailer is in position on the truck, as will be mentioned later.

Preferably the ends of the ears 27 are curved, as illustrated at 30 in Figs. 3 and 5, and the upper outer edges of the hinge blocks 20 and 21 preferably are correspondingly curved (Figs. 2 and 3). Triangular gusset plates 31 are welded to the outer face of the frame members 10, and to the ends of the angle iron members 17 and 18 at the bottom, or may be cast integral with part of the central portion of the loading beam. These gusset plates not only serve as structural reinforcements but their obliquely sloping outer edges, together with the rounded ends of the hinge blocks 20 and 21 and the rounded surfaces of the hinge ears 27, prevent ropes, cables or chains from catching on the loading beams when the loading beams are in the folded inactive position shown in Fig. 3.

A pair of trailer wheel guide rests 33 (Figs. 1 and 7) are welded to each side of the truck bunk 12 in the relative positions indicated in Fig. 1. These wheel guide rests are preferably formed in the shape indicated in Fig. 7 with the top surface sloping upwardly to the top of the bunk 12, to aid the forward wheels of the trailer in passing over the bunk when the trailer is loaded on to the truck.

At all times, except when the trailer is to be carried on the truck, the hinged end portions 15 and 16 of each foldable loading beam are kept in the folded or inward position shown in Fig. 3 and as illustrated by the forward loading beam 13 of Fig. 1. While in this folded or inward position the end portions 15 and 16 are completely protected from injury such as might be caused by the inadvertent dropping of a log or other object. If, due to oversight in leaving an end portion 15 or 16 in extended position during the loading of logs, such an end portion should become damaged by the dropping of a log, the damaged end portion can still be swung back into inward position so as to avoid all possibility of engaging a wheel tire, or can be removed entirely. Removal and replacement of an end portion is very simply done by removing the cotter pin 25 and pulling out the hinge pin 22 or 23.

When the trailer is to be carried on the truck the end portions of the loading beams are swung into the outward or extended position shown in Fig. 2. The trailer is then loaded on to the truck. Assuming that the trailer is a dual axle vehicle, the front wheels of the trailer will pass over the truck bunk, with the assistance of the wheel guide rest 33, and, assuming that dual wheels in place of single wheels are employed, the inner dual wheels of the front pair of wheels of the trailer will be stably supported on the end portions of the front loading beam 13 and will bear against the corresponding wheel guide on the truck bunk. Similarly, the inner dual wheels of the rear pair of wheels of the trailer will be supported on the end portions of the rear loading beam 14 and will also bear against the guide rests on the rear face of the truck bunk. The trailer will then be in the carrying position illustrated in Fig. 7. Each inner dual wheel of the trailer, resting on an end portion of a loading beam, will also rest against the outer face of the top lug 29 of the end portion of the loading beam (as apparent from Fig. 6) and thus the top lugs 29 will consequently serve to prevent any side slippage of the trailer while so positioned on the truck.

If by chance a single axle trailer is to be employed instead of the dual axle trailer illustrated, only the rear loading beam 14 on the truck will be used and the trailer wheels, when the trailer is loaded on to the truck, will then be in the same position as the rear wheels of the trailer shown in Fig. 7. In such case the end portions of the front loading beam 13 will of course be kept in folded, out-of-the-way position.

Modifications could be made in the form of the end portions of my foldable loading beam and in the related other parts of the loading beam without departing from the principle of my invention, and it is not my intention to limit the scope of my invention otherwise than as set forth in the claims. However, my foldable loading beam, constructed and mounted exactly as illustrated, has proved very satisfactory and, in that form, is being adopted extensively in the heavy logging industry of this section of the country.

I claim:

1. In a truck of the character described, having a load-carrying bunk, a foldable, transversely-extending trailer loading beam mounted a spaced distance from said bunk, said loading beam including a stationary central portion rigidly connected with the truck and a pair of end portions hinged to the ends of said central portion respectively to swing in the same substantially vertical plane, means for limiting the outward swing of said end portions to a position in which the top surfaces of said end portions will be in substantially horizontal alignment with each other, a space extending inwardly from each end of said central portion to accommodate said end portions respectively when said end portions are swung inwardly into said central portion, whereby said end portions when not in use may be swung into out-of-the-way and protected position within said central portion, the space between said loading beam and the truck bunk being less than the diameter of the wheels of a trailer to be carried on the truck, whereby a wheel of the trailer will rest on each of said end portions and against said bunk when said end portions are in outward position and the trailer is loaded on the truck, and means on each of said hinged end portions for preventing side slippage of the trailer wheels when said trailer wheels are resting on said end portions and against said bunk.

2. In a truck adapted for carrying a trailer, a trailer loading beam including a stationary central portion rigidly connected with the truck, a pair of parallel spaced side members included in said central portion, and a pair of identical end portions hinged to the ends of said central portion respectively to swing in a substantially vertical plane, lugs on said end portions for limiting the outward swing of said end portions to a position in which the top surfaces of said end portions will be in substantially horizontal alignment with each other, the spacing between said parallel side members of said central portion being so arranged as to accommodate said end portions when said end portions are swung inwardly into said central portion, whereby said end portions when not in use may be swung into out-of-the-way and protected position within said central portion, and means on said end portions for preventing side slippage of the trailer wheels when said trailer wheels are resting on said end portions.

3. In a truck of the character described adapted for carrying a trailer, a trailer loading beam comprising a stationary central portion having its ends rigidly connected with the truck, a pair of parallel spaced side members included in said central portion, and a pair of identical end portions hinged to the ends of said central portion respectively to swing in a substantially vertical plane, means for limiting the outward swing of said end portions to a position in which the top surfaces of said end portions will be in substantially horizontal alignment with each other, the spacing between said parallel side members of said central portion being so arranged as to accommodate said end portions when said end portions are swung inwardly into said central portion, whereby said end portions when not in use may be swung into out-of-the-way and protected position within said central portion, and top lugs on said end portions for preventing side slippage of the trailer wheels when said trailer wheels are resting on said end portions.

4. The combination of a truck, a dual axle trailer carried on the truck, a transversely-extending bunk on the truck, and a pair of similar trailer loading beams mounted on the truck and extending transversely across the truck frame on opposite sides of the bunk respectively, each of said loading beams including a stationary central portion rigidly connected with the truck and a pair of end portions hinged to the ends of said central portion respectively to swing in a substantially vertical plane, means for limiting the outward swing of said end portions to a position in which the top surfaces of said end portions will be in substantially horizontal alignment with each other, a space extending inwardly from each end of said central portion to accommodate said end portions respectively when said end portions are swung inwardly into said central portion, whereby said end portions when not in use may be swung into out-of-the-way and protected position within said central portion, said loading beams being spaced at equal distances from said bunk respectively, this latter spacing being such as to permit the wheels of said trailer to rest on said end portions of said loading beams and against said bunk respectively, and means on said end portions for preventing side slippage of the trailer while said trailer wheels are resting on said end portions.

5. The combination of a logging truck of the character described, a dual axle trailer carried on the truck, a transversely-extending bunk on the truck, and a pair of identical trailer loading beams mounted on the truck and extending transversely across the truck frame on opposite sides of the bunk respectively, each of said loading beams comprising a stationary central portion rigidly connected with the truck, a pair of parallel spaced side members included in said central portion, and a pair of identical end portions hinged to the ends of said central portion respectively to swing in a substantially vertical plane, lugs on said end portions for limiting the outward swing of said end portions to a position in which the top surfaces of said end portions will be in substantially horizontal alignment with each other, the spacing between said parallel side members of said central portion being so arranged as to accommodate said end portions when said end portions are swung inwardly into said central portion, whereby said end portions when not in use may be swung into out-of-the-way and protected position within said central portion, wheel guide rests on the sides of said bunk located opposite said end portions respectively while said end portions are in trailer-supporting position, said loading beams being spaced at equal distances from said bunk respectively, this latter spacing being such as to permit the wheels of said trailer to rest on said end portions of said loading beams and against said guide rests on said bunk respectively, and top lugs on said end portions for preventing side slippage of the trailer wheels while said trailer wheels are resting on said end portions.

ANCEL S. PAGE.

REFERENCES CITED

The following references are of record in the file of this patent:

UNITED STATES PATENTS

| Number | Name | Date |
|--------|------|------|
| 847,159 | Buntrock | Mar. 12, 1907 |
| 1,337,416 | Tree | Apr. 20, 1920 |